United States Patent [19]

Srinivasan et al.

[11] Patent Number: 5,693,710
[45] Date of Patent: Dec. 2, 1997

[54] METHOD OF MAKING PAINTED AUTOMOBILE COMPONENTS

[75] Inventors: Sachit Srinivasan, Carrollton, Tex.; Mike Wiseman, Mechanicsburg, Ohio; Dennis Chung; Setsuo Katayanagi, both of Dublin, Ohio; Jay Hermans, Dallas; Jeff Her, Grand Prairie, both of Tex.; Fumihiko Kubota, Tochiji, Japan

[73] Assignees: Honda Giken Kogyo Kabushiki Kaisha, Tokyo, Japan; D & S Plastics International, Grand Prairie, Tex.

[21] Appl. No.: 430,549

[22] Filed: Apr. 28, 1995

Related U.S. Application Data

[63] Continuation-in-part of Ser. No. 311,843, Sep. 23, 1994, Pat. No. 5,498,671, which is a continuation of Ser. No. 16,586, Feb. 10, 1993, abandoned.

[51] Int. Cl.$^6$ .............. C08L 51/00; C08L 23/00; B05D 7/02; B60R 19/03
[52] U.S. Cl. .............. 525/63; 525/64; 525/69; 525/71; 525/74; 525/79; 525/240; 427/407.1; 427/412.1; 427/412.3; 427/419.1
[58] Field of Search .............. 525/74, 240, 79, 525/63, 64, 69, 71; 427/407.1, 412.1, 412.3, 419.1

[56] References Cited

U.S. PATENT DOCUMENTS

| | | | |
|---|---|---|---|
| 3,862,106 | 1/1975 | Fischer | 525/240 |
| 3,884,993 | 5/1975 | Gros | 525/211 |
| 4,536,547 | 8/1985 | Lundberg et al. | 525/186 |
| 4,607,074 | 8/1986 | Hazelton et al. | 525/240 |
| 4,833,194 | 5/1989 | Kuan et al. | 525/240 |
| 4,843,128 | 6/1989 | Cesare | 525/193 |
| 4,843,129 | 6/1989 | Spenadel et al. | 525/193 |
| 5,011,891 | 4/1991 | Spenadel et al. | 525/211 |
| 5,162,441 | 11/1992 | Nakata et al. | 525/194 |
| 5,214,103 | 5/1993 | Imao et al. | 525/211 |
| 5,239,000 | 8/1993 | Kimm et al. | 525/240 |

FOREIGN PATENT DOCUMENTS

| | | |
|---|---|---|
| 0 519 691 A2 | 12/1992 | European Pat. Off. |
| 0 537 368 A1 | 4/1993 | European Pat. Off. |

OTHER PUBLICATIONS

Hawley's Condensed Chemical Dictionary, 12th ed., 1993 p. 491.
Rubber World Blue Book excerpt.

*Primary Examiner*—Mark L. Warzel
*Attorney, Agent, or Firm*—Pennie & Edmonds

[57] ABSTRACT

A method of making articles of manufacture, such as automobile bumpers and other components, formed from thermoplastic olefin compositions, having improved resistance to gasoline and other fluids when painted with flexible coatings such as two component polyurethane paints, and the like, are disclosed. The compositions used to form these articles include a thermoplastic olefin such as crystalline polypropylene, crystalline polyethylene or mixtures thereof with a first rubber component of an ethylene propylene diene rubber having a high molecular weight and a second rubber component of an ethylene propylene diene rubber having a low molecular weight, wherein the first rubber component has a molecular weight of 4 to 200 times that of the second rubber component.

20 Claims, No Drawings

METHOD OF MAKING PAINTED AUTOMOBILE COMPONENTS

CROSS-REFERENCE TO RELATED APPLICATIONS

This application is a continuation-in-part of application Ser. No. 08/311,843 filed Sep. 23, 1994, now U.S. Pat. No. 5,498,671, which is a continuation of application Ser. No. 08/016,586 filed Feb. 10, 1993, abandoned.

FIELD OF THE INVENTION

The invention relates to a method for making painted articles of thermoplastic compositions. These compositions have improved adherence for paints or other coating materials, so that the painted articles are useful for automobile components, and in particular automobile bumpers. The improved adherence of the paints or coatings to the article to have good resistance to petroleum fluids, such as gasolines and the like.

BACKGROUND OF THE INVENTION

Polymer blends can be formed or shaped into lightweight and durable articles useful, for example, as automobile parts, such as bumpers, toys, and housings for various types of equipment. Unfortunately, articles manufactured from polymer blends, such as those formed of polyethylene, polypropylene and rubber, are difficult to treat so that the paint durably adheres to the surface of the article. Paint adhesion is a particular concern in the case of articles formed from blends derived from thermoplastic olefin ("TPO") compositions such as those disclosed U.S. Pat. No. 4,480,065; U.S. Pat No. 4,412,016 and U.S. Pat. No. 4,439,573.

TPO compositions are blends of synthetic rubber and polyolefins such as polypropylene and polyethylene. Because articles made from TPO compositions have gained acceptance in the automotive industry as bumpers and other body parts and the like, it is important that paint adheres to articles formed from the TPO composition without peeling, chipping, or otherwise failing, even when the article is subjected to petroleum fluids such as gasolines and the like.

Automotive components and other articles formed from TPO blends that contain substantial amounts of polypropylene exhibit poor adherence for coating paints. Therefore, these articles must be treated prior to applying coating materials, such as paints, by the application of interlayer coatings to promote adhesion. Unfortunately, when the coatings are permeable, the adhesion promoter interlayers dissolve in petroleum fluids, such as gasoline, and paint will often fail to adhere to articles formed from TPO compositions when the painted article is subjected to petroleum fluids. Many paints either do not adhere to articles formed from TPO compositions, or peel or chip away under normal use, high humidity conditions, or in the presence of fuels or solvents; a typical environment for automobile components.

Various methods have been tried to improve the adherence of paints to articles formed from TPO compositions having substantial amounts of polypropylene and/or rubber. Methods of the art have employed primers or adhesion promoters such as chlorinated polyolefins, as well as surface treatments. Although these methods have improved the adherence of these articles for coating materials, such as paints, these methods have not been entirely satisfactory. For example, adhesion promoters such as chlorinated olefins are suspectable to attack by petroleum fluids, such as gasolines. Also, the prior art methods for increasing adherence of polymer compositions are costly and time consuming.

A need therefore exists for a method of forming articles of manufacture, such as automobile components, and in particular automobile bumpers, from polymer compositions that show improved adherence for coatings, such as paints, to enable the manufacture of coated articles, which show improved resistance to attack by fluids.

SUMMARY OF THE INVENTION

The present invention generally relates to a method of making a painted article which comprises: molding in the form of an article a polymer blend composition comprising about 10 to 90% by weight of an olefin component, about 10% to 50% by weight of a first rubber component of a high molecular weight ethylene-propylene-diene rubber, and about 1 to 20% by weight of a second rubber component of a low molecular weight ethylene-propylene-diene rubber, and painting at least part of the article with a paint or coating. Alternatively, the method can include forming the polymer blend composition into a preform and applying a paint composition to one or more surfaces of the preform.

Preferably, the article of manufacture is an automobile component, such as an automobile bumper, the olefin component comprises a polyolefin, such as a thermoplastic polyolefin and the coating comprises a two component polyurethane composition. For good adhesion of the paint to the article, the molecular weight of the first component should be at least about 4 to 200 times that of the second component. Advantageously, the first rubber component can have a weight average molecular weight of between about 40,000 and 300,000, and the second rubber component can have a number average molecular weight of between about 2,000 and 10,000 to achieve the desired paint adhesion.

The first and second rubber components may be present in sufficient amounts to obtain a weight ratio of between about 2:1 and 10:1, preferably 3:1 and 5:1, and the molecular weight of the second rubber component is preferably about 5,000 to 7,000. The second rubber component may have a diene content of at least about 7%, and preferably at least about 10%.

The olefin component may be semi-crystalline polyethylene, semi-crystalline polypropylene or mixtures thereof, and an agent for compatibilizing the olefin component with the first and second rubber components may be added to the polymer blend composition. Preferred compatibilizing agents include a copolymer of polypropylene with a polar compound such as at least one of polystyrene, polyester, polyurethane, an acrylic compound, or a mixture thereof. Advantageously, these agents have a molecular weight of below about 100,000. A copolymer of polypropylene-graft-(styrene-co-hydroxypropylmethacrylate) or a copolymer of polystyrene-co-acrylonitrile grafted with maleic anhydride is most preferred.

The high molecular weight ethylene-propylene-diene rubber may be a mixture of two amorphous materials wherein each may be present in an amount of about 35 to 65% by weight. One amorphous material comprises a mixture of at least about 60% ethylene and the balance propylene while the other amorphous material comprises a mixture of substantially equal amounts of ethylene and propylene. The higher ethylene content amorphous material may have a diene content of about 3–4% while the amorphous material may have a diene content of about 5%. The two amorphous materials are preferably present in substantially equal quantities.

DETAILED DESCRIPTION OF THE INVENTION

The invention is directed to the method of manufacture of articles such as automobile bumpers and other components, formed from polymer blends having improved adhesion to coating materials and improved resistance to fluids. In accordance with the invention, polymer blends are used in the making articles of manufacture that have improved adherence for coating materials, such as paints. The invention is directed to articles of manufacture, such as automobile bumpers and other components, formed from these polymer blends.

In the method of making articles of manufacture from polymer blends according to the present invention, conventional polypropylenes can be employed as the olefin component. These polypropylenes may be blended with polyethylenes, if desired. Copolymers of propylene and ethylene also may be used as the olefin component. When a copolymer of propylene and ethylene is utilized, the copolymer either can be in the form of a random copolymer, a block copolymer, or a graft copolymer. The crystallinity of the olefin component can vary from substantially amorphous to partially crystalline. When polypropylene is used as the olefin component, the polypropylene has 10–98% crystallinity, preferably 30–90% crystallinity, as determined by X-ray analysis or solvent extraction. This component comprises about 10 to 90% by weight of the composition, and preferably about 40 to 90%.

The ethylene-propylene-diene rubber components used in the invention may constitute up to about 60% or more of the compositions of the invention. The amounts of the first and second ethylene-propylene-diene rubbers may individually constitute 10 to 50 and 1 to 20 weight percent, respectively, of the compositions of the invention. In these ethylene-propylene-diene rubber components, the ethylene content can be 20 to 80 mole percent of the rubber, polypropylene can be 20 to 80 mole percent of the rubber, and diene can be from 2–20 mole percent of the rubber. Useful dienes include, but are not limited to, those having between about 4 to 15 carbons.

The diene rubber components employed in the blends used in the invention may be any rubber that is compatible or may be rendered compatible with the other ingredients of the blend. The term "compatible" is intended to mean that when the components of the blend are combined, the resultant blend can be molded, extruded or otherwise formed or shaped into commercially useful articles. The primary requirements are that the diene rubber has sufficiently low viscosity so that it can be dispersed into the blend. Fillers and coupling agents may be used to render chemically dissimilar components sufficiently compatible to be suitable in many cases.

Diene rubber materials which offer an excellent compromise of cost and performance are ethylene-propylene-diene rubbers and styrene-butadiene rubbers. Other useful rubber materials include polymers containing 1,4-butadiene, isoprene, 1,4-hexadiene, ethylidene-norbornene and copolymers of ethylene-propylene with these diene rubbers. Examples of useful rubbers are terpolymers of ethylene, propylene with dicyclopentadiene as well as terpolymers of ethylene, propylene with ethylidene-norbornene. Useful high molecular weight diene rubbers include ethylene-propylene-dicyclopentadiene and the like. Useful low molecular weight rubbers include ethylene-propylene-ethylidene-norbornene. Less preferred but also suitable are polyisoprene, bromobutyl rubber, and nitrile rubber. Combinations of these hydrocarbons and copolymers also can be used.

The high molecular weight ethylene-propylene-diene rubber component may be a mixture of two different amorphous materials. The first amorphous material will have a greater amount of ethylene, typically about 60% or more, relative to the amount of propylene present. A 70:30 ratio of ethylene and propylene is preferred. The other amorphous material will have approximately the same amounts of ethylene and propylene present. i.e., a 50:50 ratio. The diene content of the first amorphous material is preferably about 3 to 4%, while the diene content of the second amorphous material is preferably about 5%. The relative amounts of the amorphous materials can vary, but each is advantageously used in an amount of 35 to 65%. Substantially equal amounts of each amorphous materials are used for optimum results.

The following is a list of other rubber materials which may be employed in the invention:

| Name | Type | Supplier |
| --- | --- | --- |
| Polysar xG006 | Ethylene-Propylene-ENB | Polysar |
| Nordel 2722 | Ethylene-Propylene-Hexadiene | DuPont |
| Nordel 1320 | Ethylene-Propylene-diene | |
| Vistalon 2504 | Ethylene-Propylene-diene | Exxon |
| Kraton G 11650 | Styrene-Ethylene-Butadiene Styrene | Shell |
| Stereon 840 A | Styrene-Butadiene | Firestone |
| GE 7340 | Hydrogenated Styrene-Butadiene | Goldsmith & Eggleton |
| Natsyn 220 | Polyisoprene | Goodyear |
| Dutral TER 4334 | Ethylene-Propylene-diene | Enichem |

The blends used in the invention can further comprise an agent for compatibilizing the olefin component with the first and second ethylene-propylene-diene rubber components. Compatibilizing agents typically have a molecular weight below about 100,000. The compatibilizing agent can be a copolymer of polypropylene with a polar compound such as polystyrene, polyester, polyurethane, an acrylic compound, or a mixture thereof. Useful compatibilizing agents include well-known copolymers of polystyrene-co-acrylonitrile. Particularly useful compatibilizing agents include commercially available copolymers of polystyrene-co-acrylonitrile grafted with maleic anhydride, and commercially available copolymers of polypropylene grafted with poly(styrene-hydroxy propylmethacrylate).

It is known that paints adhere to articles formed from polymer blends through the use of an adhesion promoter. In conventional polymer blends, a crystalline material such as polypropylene is mixed with an ethylene propylene rubber component. The rubber particles present on the surface of an article molded from the blend provide sites to which the adhesion promoter can bond. The surface morphology of these molded articles shows the rubber particles as "islands" in a "sea" of the crystalline material. Thus, the adhesion promoter bonds with these islands and bridges between adjacent islands.

Without wishing to be bound by theory, it is believed that in articles manufactured according to the present invention the use of both high and low molecular weight ethylene propylene diene rubber components provides an enhanced surface morphology to the article with many more "islands" to which the adhesion promoter can attach, while providing shorter bridges between islands. This provides a more secure bond for the adhesion promoter, and, therefore, the surface of the article is more receptive to paint, which allows the paint to bond more strongly. In addition, it is believed that these terpolymer rubbers provide a stronger bond between the adhesion promoter and the rubber, possibly due to the enhanced permeability of the terpolymers.

Articles formed from the polymer blends according to the invention have excellent paintability, a broad range of stiffness values, as well as high impact and tensile strengths, which make them suitable for automotive applications. The polymer compositions of the invention can be molded or otherwise formed or shaped to produce articles that are lightweight, durable, and have surfaces that are paint receptive. The articles can be treated with an adhesion promoter and then painted, and the paint cured at temperatures exceeding 80° C. to produce a durable and attractive finish. Any of the conventional adhesion promoters can be used with good results.

Articles produced with the polymer blends of the invention can be coated with paints, particularly with paints such as commercially available two-component polyurethanes, to provide products with superior fluid resistance. Generally the paint are applied as a system wherein an adhesion promoter such as RB900 WCD (chlorinated polyolefin) or the like is applied and dried, then a base coat such as R784HCD (2K urethane metallic base coat), R784HS (2K urethane metallic base coat), R773 (2K urethane solid base coat), RK7131 (2K urethane solid base coat), or the like is applied and dried, and finally a clear coat such as R789 (2K urethane clear coat), R788MC (2K urethane clear coat), R788M (2K urethane clear coat), RK7118 (2K urethane clear coat), or the like is applied and dried. These types of paints are well known in the paint and coatings industry.

Various additives can be incorporated into the polymer blends used in the invention to vary the physical properties of the articles of manufacture formed from the blends, while retaining good paint adhesion. These additives may include pigments, dyes, processing aids, antistatic additives, surfactants and stabilizers such as those which generally are used in polymeric compositions. Particularly useful additives may include styrene-maleic anhydride copolymers and cationic surfactants for improving moisture resistance, and well known copolymers such as ethylene-acrylic acid copolymers ("EAA") and ethylene-methacrylic acid copolymers ("EMAA"), or mixtures or blends thereof.

A test of the fluid resistance of articles manufactured according to the invention is performed on articles or preforms formed from the molded polymer blends, bearing a single coating of 2-part commercially available polyurethane. The fluid resistance is evaluated by placing the coated preforms into a gasoline bath. The gasoline bath may be mixtures of any of 90% unleaded gasoline and 10% ethanol; 90% unleaded gasoline and 10% of a 50:50 blend of methanol with tertiary-butyl alcohol; or 100% unleaded gasoline. The preforms employed are 2½" squares, or possibly 1"×3" bars. The coated preform remains immersed in the gasoline bath until failure, that is, paint at the edges of the preform curls away from the preform. The coated preform then is removed from the bath and the time to failure recorded. The fluid resistance of the coated preforms are shown in Table I.

The % peel of the paint from the preform also is a measure of the ability of the preform to retain paint against the action of petroleum fluids such as gasoline. The painted preform is removed from the gasoline bath after a 30-minute immersion and measuring the area, if any, that is free of paint. The % peel is determined by dividing the area of the preform free of paint by the original painted area of the preform. Low % peel is desired.

EXAMPLES

The invention will now be described by reference to the following non-limiting examples. Unless otherwise specified, all percentages are by weight and all temperatures are in degrees Celsius.

Examples 1–11

Preforms of the blends of Examples 1–11 are formed by blending the components in the amounts given in Table I. Blending of the components is performed by well known methods and devices such as Banbury mixers and extrusion equipment. The polymer blends can be molded into shaped preforms by known methods such as extrusion, injection molding, blow molding, or thermoforming. The shaped preforms of the polymer blends are coated with an adhesion promoter, a base coat, and a clear coat. Each coat is sprayed on and dried before the next coat is applied. The polymer blends also can be pelletized for storage and shipment prior to molding into shaped articles.

TABLE I

| COMPONENT (%) | EX1 | EX2 | EX3 | EX4 | EX5 | EX6 | EX7 | EX8 | EX9 | EX10 | EX11 |
|---|---|---|---|---|---|---|---|---|---|---|---|
| Polypropylene[1] | 70 | 65 | 60 | 60 | 60 | 60 | 60 | 60 | 60 | 55 | 60 |
| TER (EPDM)-E[2] | 20 | 25 | 30 | 30 | 30 | 30 | 30 | 30 | | | |
| T-CP80[3] | | | | 10 | | | | | | | |
| T-68-ENB[4] | | | | | 10 | | | | | | |
| T-65-DCPD[5] | | | | | | | 10 | | | | |
| T-55-DCPD[6] | 10 | 10 | 5 | | | | | 10 | 10 | 5 | 5 |
| T-67-ENB[7] | | | | | | 10 | | | | | |
| Ter-EPDM[8] | | | | | | | | | 20 | 35 | 30 |
| A3500[9] | | | | | | | | | 10 | 5 | 5 |
| Coating System = Morton R784/R789 | | | | | | | | | | | |
| Gasoline Resistance[10] | >30 | >30 | >30 | 20 | 23 | 25 | 25 | 60 | >150 | >90 | >30 |
| % PEEL[11] | 0 | 0 | 0 | <7 | <5 | <5 | <5 | 0 | 0 | 0 | 0 |
| Coating System = Morton R773/R788 | | | | | | | | | | | |
| Gasoline Resistance[10] | >30 | >30 | >30 | >30 | >30 | >30 | >30 | >30 | >30 | >30 | >30 |
| % PEEL[11] | 0 | 0 | 0 | 0 | 0 | 0 | 0 | 0 | 0 | 0 | 0 |

Notes:
[1]Polypropylene of MW >100,000
[2]Ter polymer of ethylene - propylene - diene, from Uniroyal Chemical Co.

TABLE I-continued

| COMPONENT (%) | EX1 | EX2 | EX3 | EX4 | EX5 | EX6 | EX7 | EX8 | EX9 | EX10 | EX11 |
|---|---|---|---|---|---|---|---|---|---|---|---|

[3]Low molecular weight ethylene - propylene copolymer
[4]Ethylene-propylene-[ethylidene-norbornene] with C2:C3 of 45:55 from Uniroyal Chemical Co.
[5]10% ter of Dicyclopentadiene with a $C_2:C_3 = 48:52$, Mn = 7000, available from Uniroyal Chemical Co.
[6]13% ter of Dicyclopentadiene with a $C_2:C_3 = 49:51$, Mn = 5200, available from Uniroyal Chemical Co.
[7]9% ter of Ethylene nobornene with $C_2:C_3$ of 46:54, Mn = 7500, available from Uniroyal Chemical Co.
[8]Ethylene propylene diene terpolymer available from Uniroyal Chemical Co.
[9]Graft copolymer of polypropylene with poly(styrene-hydroxypropylmethacrylate) from Nippon Oil and Fat Co.
[10]Minutes to failure; gasoline bath of 90% unleaded gasoline and 10% ethanol.
[11]% peel at 30 minutes

Comparison Examples 12–16

Comparison examples 12–16 are produced in the same manner as Examples 1–11 except that the first and second ethylene-propylene-diene rubbers are not employed. The compositions and the fluid resistance of these comparative examples is shown in Table II.

TABLE II

| COMPONENT (%) | EX. 12 | EX. 13 | EX. 14 | EX. 15 | EX. 16 |
|---|---|---|---|---|---|
| POLYPROPYLENE[1] | 70 | 70 | 70 | 70 | 70 |
| ETHYLENE-PROPYLENE COPOLYMER[2] | 30 | | | | |
| ETHYLENE-PROPYLENE COPOLYMER[3] | | 30 | | | |
| ETHYLENE-PROPYLENE COPOLYMER[4] | | | 30 | | |
| ETHYLENE-PROPYLENE COPOLYMER[5] | | | | 30 | |
| ETHYLENE-PROPYLENE COPOLYMER[6] | | | | | 30 |
| Coating System = Morton R784/R789 | | | | | |
| GASOLINE RESISTANCE[7] | 5 | 7 | 11 | <10 | 12 |
| % PEEL[8] | >90 | >90 | >90 | >90 | >90 |
| Coating System = Morton R773/R788 | | | | | |
| GASOLINE RESISTANCE[7] | >30 | >30 | >30 | >30 | >30 |
| % PEEL[8] | 0 | 0 | 0 | 0 | 0 |

[1]Polypropylene of molecular weight of more than 100,000
[2]Ethylene-propylene copolymer of 72% ethylene, 28% polypropylene, MW = 70,000
[3]Ethylene-propylene copolymer of 72% ethylene, 28% polypropylene, MW = 50,000
[4]Ethylene-propylene copolymer of 76% ethylene, 24% polypropylene, MW = 50,000
[5]Ethylene-propylene copolymer of 76% ethylene, 24% polypropylene, MW = 50,000
[6]Ethylene-propylene copolymer of 76% ethylene, 24% polypropylene, MW = 50,000
[7]Minutes to failure; gasoline bath of 90% unleaded gasoline and 10% ethanol
[8]% peel at 30 minutes Upon reviewing the data, it is seen that both the high and low molecular weight EPD rubbers are present to obtain enhanced paint bonding to the surface of an article formed from the molded polymer blend. The best results are achieved when a compatibilizing agent is used, as shown by components Ex. 9–11 of Table I. Also, better gasoline resistance is attained when a lower molecular weight EPD rubber component having a relatively higher diene content is employed.

Other aspects of the invention will be apparent to those skilled in the art from consideration of the specification, or from practice of the invention disclosed herein. It is intended that the specification and examples be considered as exemplary only, with the scope and spirit of the invention being indicated by the following claims.

What is claimed is:

1. A method of making a painted article which comprises: molding in the form of an article a polymer blend composition comprising about 40 to 90% by weight of the composition of a crystalline or semi-crystalline polyolefin, about 10% to 50% by weight of the composition of a first rubber component of an ethylene-propylene-diene rubber having a weight average molecular weight of about 40,000 to 300,000, and about 1 to 20% by weight of a second rubber component of an ethylene-propylene-diene rubber having a number average molecular weight of at least about 2,000, wherein the molecular weight of the first rubber component is at least about 4 to 200 times that of the second rubber component, and painting at least part of the article with a two-component polyurethane system comprising a base coat and a clear coat, wherein said base coat is selected from the group consisting of 2 component urethane metallic base coats and 2 component urethane solid base coats.

2. A method of improving the fluid resistance of polymeric articles which comprises: forming a polymer blend composition into a preform, said polymer blend composition comprising: about 40 to 90% by weight of the composition of a crystalline or semi-crystalline polyolefin, about 10% to 50% by weight of the composition of a first rubber component of an ethylene-propylene-diene rubber having a weight average molecular weight of between about 40,000 and 300,000, and about 1 to 20% by weight of a second rubber component of an ethylene-propylene-diene rubber having a number average molecular weight of about 2,000 to 10,000; and applying to one or more surfaces of said preform a paint composition comprising a base coat and a clear coat, wherein said base coat is selected from the group consisting of 2 component urethane metallic base coats and 2 component urethane solid base coats, wherein said paint composition durable adheres to said preform to improve the fluid resistance of the article.

3. The method of claim 1 or 2 wherein the article is an automobile component.

4. The method of claim 3 wherein the automobile component is an automobile bumper.

5. The method of claim 1 which further comprises selecting the second rubber component to have a number average molecular weight of between about 2,000 and 10,000.

6. The method of claim 2 or 5 which further comprises providing the first and second rubber components in sufficient amounts to obtain a weight ratio of between about 2:1 and 10:1, and wherein the number average molecular weight of the second rubber component is about 5,000 to 7,000.

7. The method of claim 6 wherein the second rubber component has a diene content of at least about 7%.

8. The method of claim 6 wherein the second rubber component has a diene content of at least about 10% and wherein the first and second rubber components are present in a weight ratio between about 3:1 and 5:1.

9. The method of claim 1 or 2 which further comprises selecting the olefin component to be semi-crystalline polyethylene, semi-crystalline polypropylene or mixtures thereof.

10. The method of claim 1 or 2 which further comprises adding to the polymer blend composition an agent for compatibilizing the olefin component with the first and second rubber components.

11. The method of claim 10 wherein the compatibilizing agent is a copolymer of polypropylene with a polar compound.

12. The method of claim 10 wherein the compatibilizing agent is a copolymer of polypropylene with at least one of either polystyrene, polyester, polyurethane, an acrylic compound, or a mixture thereof.

13. The method of claim 12 wherein the compatibilizing agent is a copolymer of polypropylene-graft-(styrene-co-hydroxypropylmethacrylate).

14. The method of claim 12 wherein the compatibilizing agent is a copolymer of polystyrene-co-acrylonitrile grafted with maleic anhydride.

15. The method of claims 1 or 2 which further comprises selecting the first rubber component to be ethylene-propylene-dicyclopentadiene and the second rubber component to be ethylene-propylene-ethylidene-norborene.

16. The method of claim 1 or 2 which further comprises selecting the first rubber component to be a mixture of a crystalline material and an amorphous material.

17. The method of claim 16 wherein the crystalline and amorphous materials are each present in an amount of about 35 to 65% by weight.

18. The method of claim 16 wherein the crystalline material comprises a mixture of at least about 60% ethylene and the balance propylene and wherein the amorphous material comprises a mixture of substantially equal amounts of ethylene and propylene.

19. The method of claim 18 wherein the crystalline material has a diene content of about 3 to 4% and the amorphous material has a diene content of about 5%.

20. The method of claim 16 wherein the crystalline and amorphous materials are present in substantially equal quantities.

* * * * *